Whitaker and Read,
Mower
No. 899 Reissued, Feb. 7, 1860.
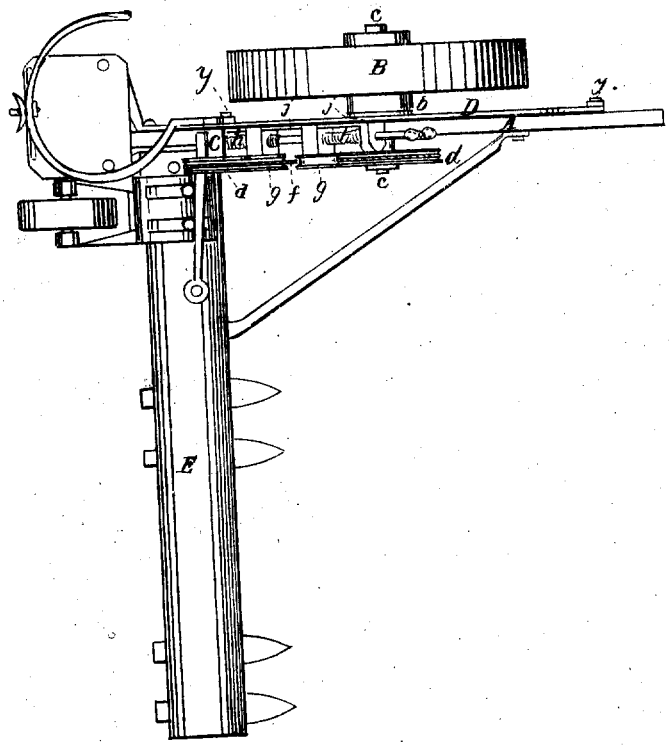
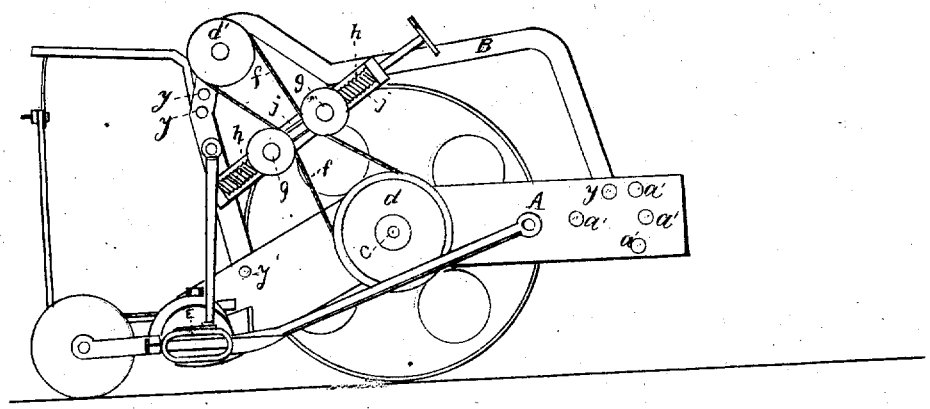
John D Whitaker
Calvin D Read
Witnesses
W H Burton
[illegible]

UNITED STATES PATENT OFFICE.

J. T. WHITAKER AND C. D. READ, OF ST. CHARLES, ILLINOIS.

IMPROVEMENT IN REAPING AND MOWING MACHINES.

Specification forming part of Letters Patent No. 17,990, dated August 11, 1857; Reissue No. 899, dated February 7, 1860.

DIVISION D.

*To all whom it may concern:*

Be it known that we, JOHN T. WHITAKER and CALVIN D. READ, of St. Charles, in the county of Kane and State of Illinois, have made a certain new and useful Improvement in Reaping and Mowing Machines, of which the following is a full, clear, and exact description, reference being had to the accompanying drawings, making part of this specification, in which—

Figure 1 represents a plan of such parts of a harvesting-machine to which our improvement relates, and Fig. 2 a side elevation of the same.

Our invention which is the subject of this specification relates to an improvement for tightening the belt which drives the reel that gathers the grain into the sickle, which we effect by means of a couple of friction-pulleys mounted upon a right-and-left screw suitably arranged at the side of the belt for that purpose.

To enable others skilled in the art to make, construct, and use our improvement, we will now proceed to describe it in detail, omitting a description of such parts of a reaping-machine as are unessential to a full understanding of our invention.

In the accompanying drawings, A represents the frame or beam for the support of the driving-wheel B, reel *d'*, and cutter-bar E, and to the front end of which the tongue is also attached, there being one center bolt-hole, *a*, formed in it, to which the tongue is pivoted, and a series of holes, *a'*, arranged in advance of it in the arc of a circle of which the former, *a*, is the center, through either of which a bolt is passed for the purpose of attaching the pole rigidly to the beam, according as circumstances may require—that is to say, when it is desired to keep the cutters close to the ground, then the bolt is passed through the upper hole of the series *a'*, and vice versa. Upon the outer side of the beam A, near is center, is riveted or otherwise secured a tubular stud, *b*, upon which is mounted the driving-wheel B, through the hollow of which is passed a shaft, *c*, upon the inner end of which is secured a pulley, *d*, that gives motion to the pulley *d'*, that drives the reel, it being for this purpose mounted on the reel-shaft *c*. The driving-wheel is kept in place on the tubular stud by means of a shoulder formed on that end of the shaft *c* which projects on the inside of the beam A, and a nut, *z*, on its opposite end—that is to say, the end which projects through the end of the stud *b*. This nut bears upon a washer which fits the square end of the shaft *c* and projects over the end of the stud *b* and hub of the driving-wheel, and is provided with projections on its inner face, which take into corresponding depressions on the face of the hub, so that when the nut *z* is screwed down on the washer the tush of the latter is made to engage with the indentations of the hub of the wheel, and the hub being slightly longer than the collar or stud *b* the wheel is kept in place, and so that it shall be free to turn on the stud, and yet cause the shaft *c* to turn, and carry with it the pulley *d*, that drives the pulley *d'* of the reel, and in this way communicate a rotary motion to the latter. The reel is supported at that end next the driving-wheel in bearings *y*, and of which there are several formed in a crooked bar, D, of iron or other suitable material, secured by means of bolts *y' y'* to the outer side of the beam A, and is driven by means of a belt, *f*, passing around the pulleys *d* and *d'*; but as this belt is apt to stretch, and also to tighten and loosen as it becomes damp and dry, and as in raising and lowering the reel the same belt is not always of the proper length to suit the various changes, we apply a belt-tightener, which enables us to remedy these various defects, and which consists in arranging two pulleys, *g* and *g'*, one on either side of the belt, as seen at Fig. 2, and mounting them on a right-and-left-hand screw, and forming on the end of the shaft on which they revolve a guide, which takes into a slotted frame, *j*, secured to the inner side of the crooked beam D, that supports the reel, by means of which, according as the screw *h* is turned, the friction-rolls *g* and *g'* are made to approach or recede from each other, thereby tightening or loosening the belt, as required, either to compensate for the change in the tightness or looseness of the belt arising from the effects of the weather, or to enable the operator to raise or lower the reel to suit the different heights of grain—all objects of great practical importance to the parties using them.

From the foregoing description it will be apparent that our belt-tightener may be applied to any machine, irrespective of the mode in which the pulleys are driven.

Having thus described our invention, what we claim as new, and desire to secure by Letters Patent, is—

Loosening and tightening the reel-belt by means of the pulleys *g* and *g'*, screw *h*, and guide-frame *j*, the whole being arranged upon the harvester-frame and operated in the manner substantially as set forth.

In testimony whereof we hereunto set our hands.

JOHN T. WHITAKER.
CALVIN D. READ.

Witnesses:
ALEX. V. SILL,
T. H. COLLINS.